United States Patent [19]
Warren et al.

[11] Patent Number: 5,435,418
[45] Date of Patent: Jul. 25, 1995

[54] EMERGENCY BRAKE SYSTEM FOR WHEELED VEHICLES

[75] Inventors: Oscar E. Warren; Bob J. Beard, both of San Antonio, Tex.

[73] Assignee: TransTech Resources, Inc., San Antonio, Tex.

[21] Appl. No.: 289,198

[22] Filed: Aug. 11, 1994

[51] Int. Cl.6 ............................................. B60T 1/00
[52] U.S. Cl. ................... 188/4 R; 188/106 P; 188/151 A; 188/106 R; 303/2; 303/13; 303/18
[58] Field of Search .......... 188/4 R, 3 R, 3 H, 151 A, 188/106 R, 106 P, 353, 265, 112 R, 2 R; 303/89, 13, 14, 18, 2-3, 84.1, 84.2, 9, 7, 9.61

[56] References Cited

U.S. PATENT DOCUMENTS

| | | | |
|---|---|---|---|
| 462,754 | 11/1891 | Wilcox | 188/4 R |
| 898,082 | 9/1908 | Wolfe | 188/4 R |
| 2,182,044 | 12/1939 | Ackerman | 188/4 R |
| 2,718,283 | 9/1955 | Ropp | 188/4 R |
| 2,957,549 | 10/1960 | Nesselberger | 188/4 R |
| 2,960,191 | 11/1960 | Roberts | 188/4 R |
| 3,078,963 | 2/1963 | Shea | 188/4 R |
| 3,176,798 | 4/1965 | Nesselberger | 188/4 R |
| 3,625,313 | 12/1971 | Lowrie | 188/4 R |
| 4,269,426 | 5/1981 | Bhushan | 188/4 R X |
| 4,325,465 | 4/1982 | Lemon | 188/4 R |

*Primary Examiner*—Douglas C. Butler
*Attorney, Agent, or Firm*—John M. Cone; William L. Clayborn

[57] ABSTRACT

An emergency brake system for wheeled vehicles includes a deformable brake wedge for each tire on one of the vehicle's axles. The brake wedges are constructed and arranged to transfer substantially all braking forces to the vehicle through the vehicle's tires during emergency braking. The system also includes releasable device for allowing the brake wedges to move between inoperative and operative positions and electrically-controlled device for retaining the brake wedges in those positions. While the brake wedges move from the inoperative position to the operative position, a control system temporarily applies the vehicle brakes associated with the tires that engage the brake wedges during emergency braking.

4 Claims, 5 Drawing Sheets

EMERGENCY BRAKE SYSTEM FOR WHEELED VEHICLES

BACKGROUND OF THE INVENTION

The present invention relates to braking systems for heavy vehicles, such as trucks, buses, and tractor-trailer combinations. More particularly, the invention relates to an emergency brake system for stopping a vehicle in the event of failure of the vehicle's normal service brake system. The emergency brake system is independent of the service brake system, but may be used in conjunction with the vehicle's service brake system in an emergency to decrease the distance required to stop the vehicle and to help to avoid jack-knifing. The emergency brake system may also be used as a security device to prevent unauthorized movement of the vehicle.

The service brake system of a heavy vehicle, such as a truck, bus, or tractor-trailer combination, may fail for a variety of reasons. For example, failure of the hydraulic or air system that provides power for the brake system prevents activation of the vehicle's brakes. When traveling downhill, a vehicle's brakes may overheat, causing the brakes' friction material to glaze, thereby rendering the brakes less effective or useless.

When a heavy vehicle's brakes fail, it may be impossible to avoid an accident, resulting in property damage and serious personal injuries or death.

When the driver of a tractor-trailer combination attempts an emergency stop, especially on a slippery road surface, the tractor and trailer may jackknife. That is, the trailer may skid laterally relative to the tractor.

Most prior art emergency brake systems transfer emergency braking force to the frame of the vehicle. If such a prior art emergency brake system were installed on most modern trailers, the emergency braking force would subject the trailer frame to undesirable stress and possible damage.

SUMMARY OF THE INVENTION

An object of the present invention is to provide an emergency brake system for heavy vehicles, such as trucks, buses, and tractor-trailer combinations, which emergency brake system can be activated to provide braking if the vehicle's service brake system fails.

A further object of the present invention is to provide an emergency brake system that can be used in conjunction with a vehicle's service brake system to decrease the vehicle's stopping distance and to help to prevent jack-knifing.

A further object of the present invention is to provide an emergency brake system in which substantially all the emergency braking force is applied to the vehicle through the vehicle's suspension.

A further object of the present invention is to provide an emergency braking system which minimizes vertical movement or "hopping" of the braking tires when the emergency brake is applied.

According to the present invention, a deformable brake wedge comprises a tire-receiving surface and a road-engaging surface. The brake wedge is constructed and arranged to transfer substantially all braking forces to the vehicle through the vehicle's suspension.

A preferred embodiment of the invention is adapted for use on a vehicle which has dual tires mounted on each end of an axle. A separate brake wedge is provided to receive each of the four tires.

The tire-receiving surface of each brake wedge includes a rear surface portion of relatively small vertical inclination and an upper surface portion of greater vertical inclination. The upper surface portion provides a contact zone at which, in use, a forward part of a vehicle tire makes contact with the brake wedge. The vertical inclination of the upper surface portion is sufficient to substantially prevent the tire rolling over the brake wedge. The road-engaging surface extends forward of the tire contact zone a sufficient distance to substantially prevent tipping of the brake wedge by the tire.

There are two pairs of brake wedges, one pair for each set of dual tires. The brake wedges of each pair are flexibly connected together to allow the brake wedges to accommodate variations in the tires and the road surface adjacent thereto. Each pair of brake wedges is pivotally and slidably connected to one end of a brake arm, and the other end of each brake arm is pivotally attached to the vehicle, thereby providing a means for allowing the brake arms to move between an inoperative position and an operative position.

The brake arms are retained in the inoperative and operative positions by a pair of locking pins, one of which engages each brake arm. Each of the locking pins is mechanically connected to a pneumatic cylinder. To activate the emergency brake system, the vehicle driver actuates an electrical switch located in the driver's compartment, which supplies current to an emergency brake control system. The control system supplies compressed air to the brake pin pneumatic cylinders, which disengages the locking pins from the brake arms, releasing the brake arms from the inoperative position and allowing them to fall toward the operative position under gravity. The air pressure in the brake pin pneumatic cylinders is then released, allowing the pins to return to their extended positions to retain the brake arms in the operative position. While the brake arms are moving from the inoperative position toward the operative position, the control system first supplies compressed air to the service brake cylinders for the tires that engage the brake wedges during emergency braking, then releases the air pressure from the service brake cylinders. This reduces the tires' rotational momentum, thereby decreasing the tires' tendency to move vertically when they first engage the brake wedges.

BRIEF DESCRIPTION OF THE DRAWINGS

An embodiment of the invention will be described, by way of example only, with reference to the accompanying drawings, in which.

DETAILED DESCRIPTION

Figure 1:
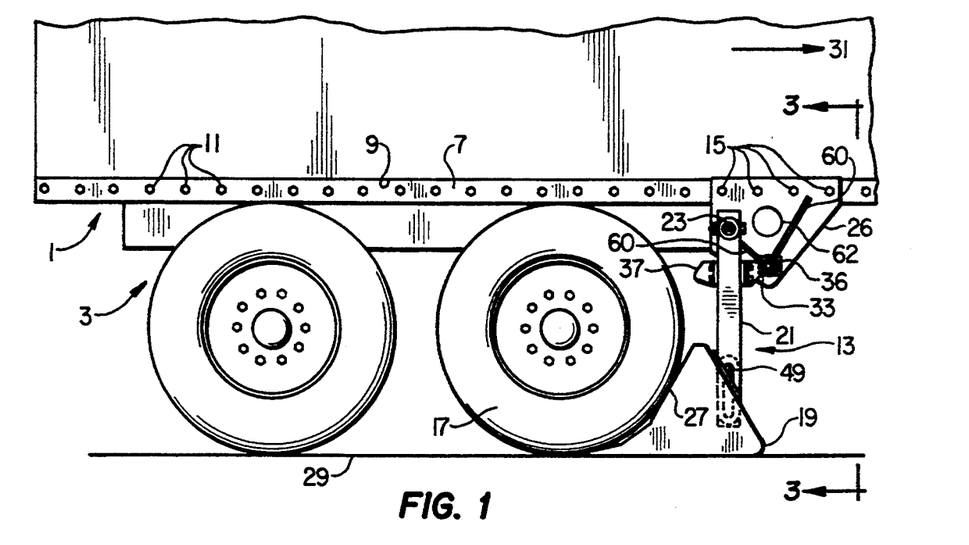
FIG. 1 is a side view of a lower rear portion of a trailer showing a preferred embodiment of the emergency brake system of the present invention in the operative position.
Figure 2:
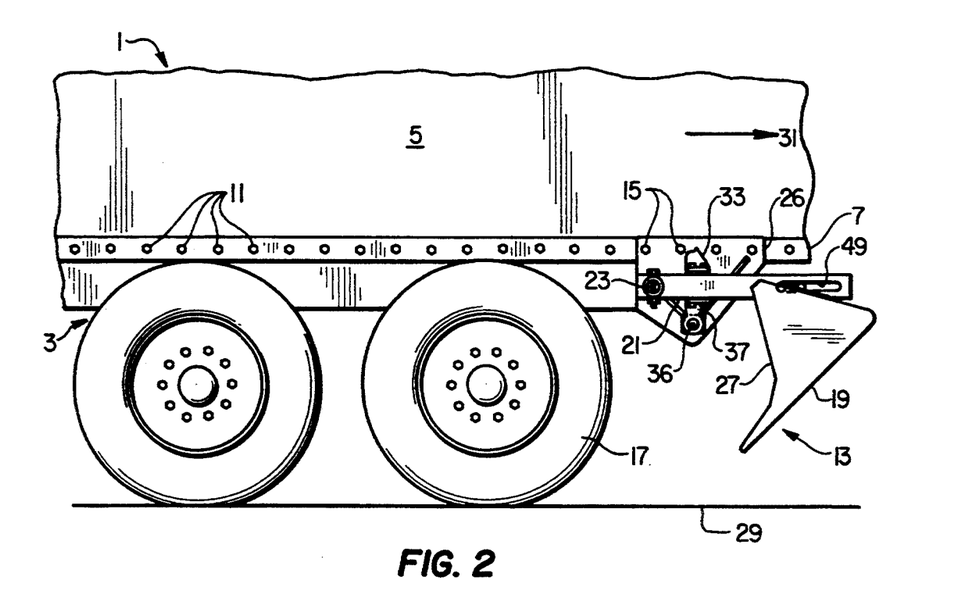
FIG. 2 is a view of FIG. 1 with the emergency brake system in the inoperative or standby position.

FIGS. 1 and 2 show the lower rear portion of a trailer 1 comprising a sliding tandem axle-wheel assembly 3 and a trailer box 5. A pair of parallel, laterally-spaced, longitudinally-extending bed rails 7 (only one of which is shown in FIGS. 1 and 2) are a part of and attached to a bottom surface 9 of the trailer box 5. The longitudinal position of the axle-wheel assembly 3 may be adjusted by moving it forward or rearward relative to the trailer box 5 and securing it to the bed rails 7 with a plurality of fasteners 11, such as nuts and bolts or pins.

While this embodiment of the invention is adapted for installation on a trailer of the type described, it is to be understood that the invention is adaptable to trailers of virtually any configuration and to other vehicles, such as buses, trucks, tanker trailers, furniture trailers, and the tractors of tractor-trailer combinations.

An emergency brake assembly 13 is also secured to the bed rails 7 by a plurality of fasteners 15, such as nuts and bolts. As described below, the emergency brake assembly 13 is moveable between an operative position, shown in FIG. 1, in which it applies braking force to the trailer's front tires 17, and an inoperative position, shown in FIG. 2, in which the tires 17 are free to rotate.

When the emergency brake assembly 13 is in an operative position, as in FIG. 1, each forward tire 17 of the trailer 1 is engaged by a corresponding brake wedge 19. As is generally the case with commercial trailers, there are four forward tires 17. Thus, the emergency brake assembly 13 includes four brake wedges 19, one for each forward tire 17, though only one brake wedge 19 (and its associated forward tire 17) is visible in FIGS. 1 and 2.

We have found that having a separate brake wedge 19 for each forward tire 17 provides superior performance over having a single brake wedge that engages both of a pair of forward tires. This is due to the ability of the separate brake wedges 19 to accommodate slight variations in conditions of the forward tires 17 and in the road surface to which each brake wedge 19 is exposed. In addition, having a separate brake wedge 19 for each forward tire 17 results in a lighter, more economical emergency brake system. Finally, having a separate brake wedge 19 for each forward tire 17 promotes proper braking if a brake wedge 19 or forward tire 17 fails during emergency braking.

On each side of the trailer 1, two brake wedges 19 are slidably attached to a brake arm 21. The brake wedges 19 are described in greater detail below. The brake arms 21 are attached to a tubular brake arm shaft 23 by a suitable means, such as a fastener or welding. The brake arm shaft 23 is mounted for axial rotation in a pair of spaced-apart brackets 25 and 26 (FIG. 3), which are attached to the bed rails 7 by the fasteners 15.

As shown in FIG. 1, when the brake assembly 13 is in the operative position, each forward tire 17 is engaged by its corresponding brake wedge 19 at a rear surface 27 of the brake wedge 19. As a result, the forward tires 17 are restrained from rotating, and the portion of the weight of the trailer 1 supported by the forward tires 17 is transferred to the corresponding brake wedges 19. Thus, the brake wedges 19 are pressed against the road surface 29, causing a braking action which restrains forward motion 31 of the trailer 1.

Figure 3:
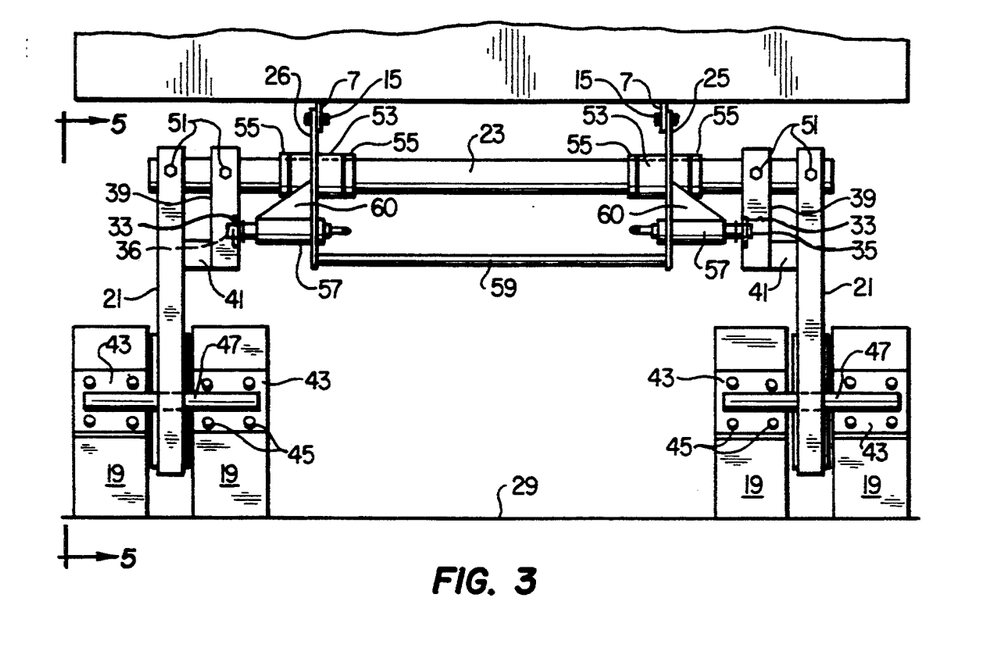
FIG. 3 is a front view, taken through plane 3—3 in FIG. 1, of the emergency brake system with the components which actuate the locking pins omitted.

Referring now to FIG. 3, each brake arm 21 is laterally supported by a secondary arm 39 and a brace 41. The brake arms 21, secondary arms 39, and braces 41 are constructed of rectangular tubing of a suitable material, such as steel, and are joined by a suitable means, such as welding.

A down striker plate 33 and an up striker plate 37 (FIGS. 1 and 2) are attached to opposite sides of each secondary arm 39 by suitable means, such as welding or fasteners. When the brake assembly 13 is in the operative position (FIG. 1), a pair of locking pins 35 and 36 engage the down striker plates 33, retaining the secondary arms 39 and, thus, the brake arms 21 in position. The secondary arms 39 and brake arms 21 are retained in the inoperative or standby position (FIG. 2) by engagement of the locking pins 35 and 36 with the up striker plates 37.

A brake wedge mounting plate 43 (FIG. 3) is attached to each brake wedge 19 by a suitable means, such as fasteners 45. A brake wedge plate bar 47 connects two brake wedge plates 43 and is slidably mounted in a slot 49 (FIGS. 1 and 2) in the brake arm 21. As a result, the brake wedges 19 may move substantially vertically when the brake arms 21 are in the operative position to compensate for vertical movement of the trailer box 5 due to variations in the load carried and road irregularities. The brake wedge mounting plates 43 and brake wedge plate bars 47 are constructed of a suitable material, such as steel.

The brake arms 21 and secondary arms 39 are attached to the brake arm shaft 23 by suitable means, such as fasteners 51 or welding. The brake arm shaft 23 passes through an integral rotator shaft boss 53 on each bracket 25 and 26. Four collars 55 locate the brake arm shaft 23 laterally. The collars 55 are secured to the brake arm shaft 23 by suitable means, such as set screws (not shown). Bearings or bushings (not shown) within the rotator shaft bosses 53 allow the brake arm shaft 23 to rotate easily and dependably and absorb vibration and shock.

The locking pins 35 and 36 pass through an integral locking pin boss 57 on each bracket 25 and 26 and can be moved laterally through bushings or bearings (not shown) within the locking pin bosses 57.

A spreader bar 59 prevents lateral motion of the bottom portions of the brackets 25 and 26. In addition, gussets 60 reinforce the rotator shaft bosses 53 and the locking pin bosses 57.

Figure 4:
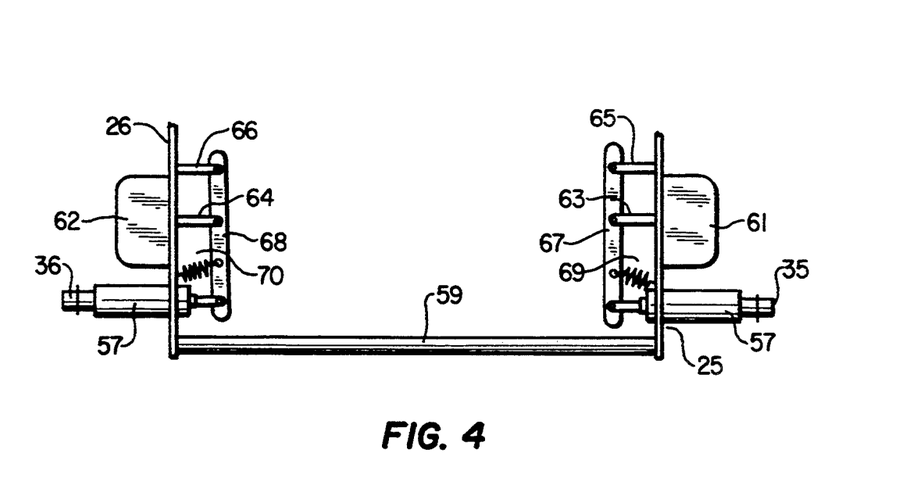
FIG. 4 is a front view of the components which actuate the locking pins.

FIG. 4 is a front view showing the actuating components for the locking pins 35, 36. As can be seen, the actuating components for the locking pins 35, 36 are mirror images of each other; therefore, only the actuating components for the right locking pin 35 will be described.

A locking pin pneumatic cylinder 61, which includes a shaft 63, and a pivot bracket 65 are rigidly attached to the right bracket 25. A pivot arm 67 is pivotally connected to the pivot bracket 65, the cylinder shaft 63, and the right locking pin 35. Opposing ends of a return spring 69 are attached to the pivot arm 67 and to the bracket 25. When compressed air is supplied to the pneumatic cylinders 61, 62, the cylinder shafts 63, 64 move inwardly toward each other. That motion is transferred to the locking pins 35, 36 by the pivot arms 67, 68. If the brake assembly 13 is in the inoperative position shown in FIG. 2, supplying compressed air to the cylinders 61, 62 disengages the locking pins 35, 36 from the up striker plates 37, allowing the brake arms 21 to drop toward the operative position shown in FIG. 1. If the brake assembly 13 is in the operative position, supplying compressed air to the cylinders 61, 62 disengages the locking pins 35, 36 from the down striker plates 33, allowing the brake arms 21 to be raised manually. When the air pressure is released from the cylinders 61, 62, the return springs 69, 71 act through the pivot arms 67, 68 to urge the locking pins 35, 36 outwardly. The inner sides of the secondary arms 39, up striker plates 37, and down striker plates 33 prevent outward motion of the locking pins 35, 36 when the brake assembly 13 is not in either the operative or inoperative position.

As discussed below in connection with FIG. 8, a control system is provided which supplies compressed air to, and release air pressure from, the pneumatic cylinders 61, 62

As best shown in FIG. 3, the brake wedges 19 of each pair of brake wedges 19 are retained in position relative to one another by the wedge mounting plates 43 and the wedge bar 47. The wedge mounting plates 43 and the wedge bar 47, in cooperation with the somewhat flexible brake wedges 19, allow the brake wedges 19 of each pair to move slightly relative to each other so as to accommodate slight variations in the forward tires 17 and in the road surface 29 to which each brake wedge 19 is exposed.

Figure 5:
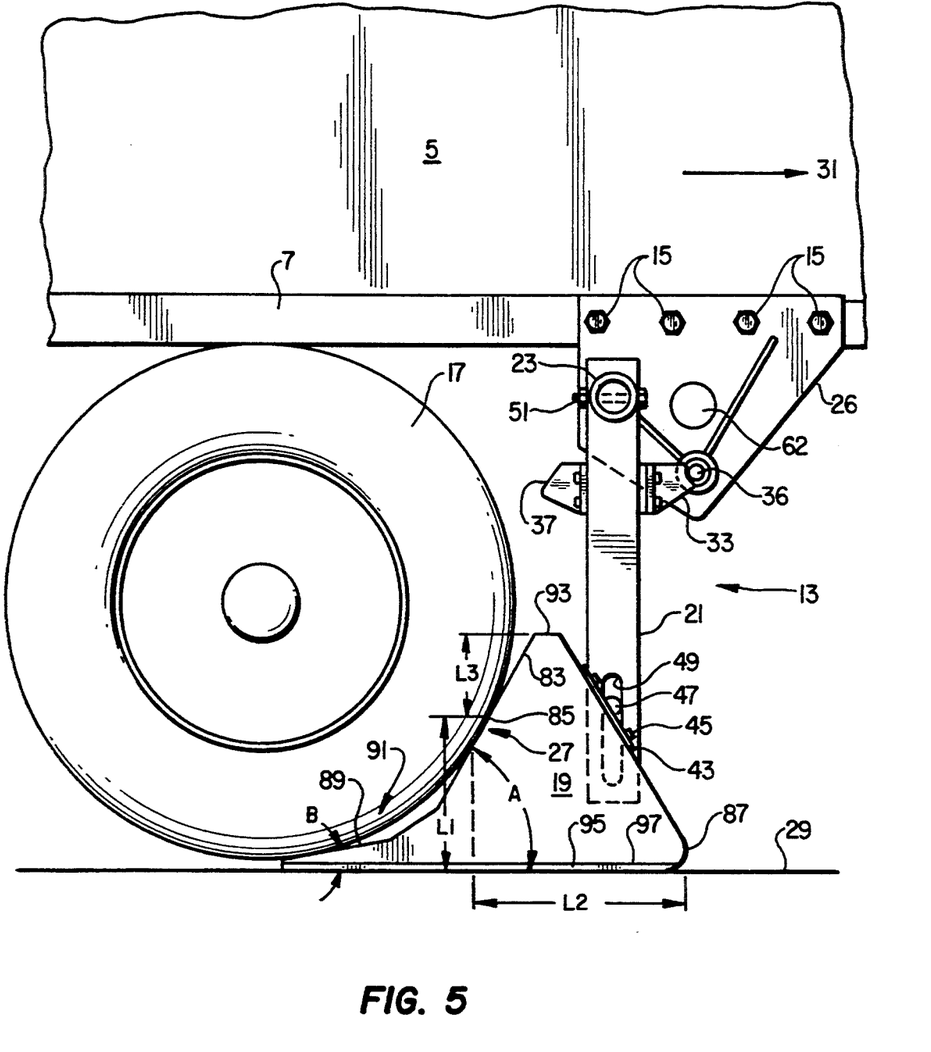
FIG. 5 is a side view of the emergency brake system of FIG. 1 taken through the plane 5—5 in FIG. 3.

As seen in FIG. 5, when the brake assembly 13 is in the operative position, each forward tire 17 engages an upper portion 83 and a lower portion 89 of the rear surface 27 of the corresponding brake wedge 19. As a result, the tire 17 is supported by the brake wedge 19 and does not contact the road surface 29.

Figure 6:
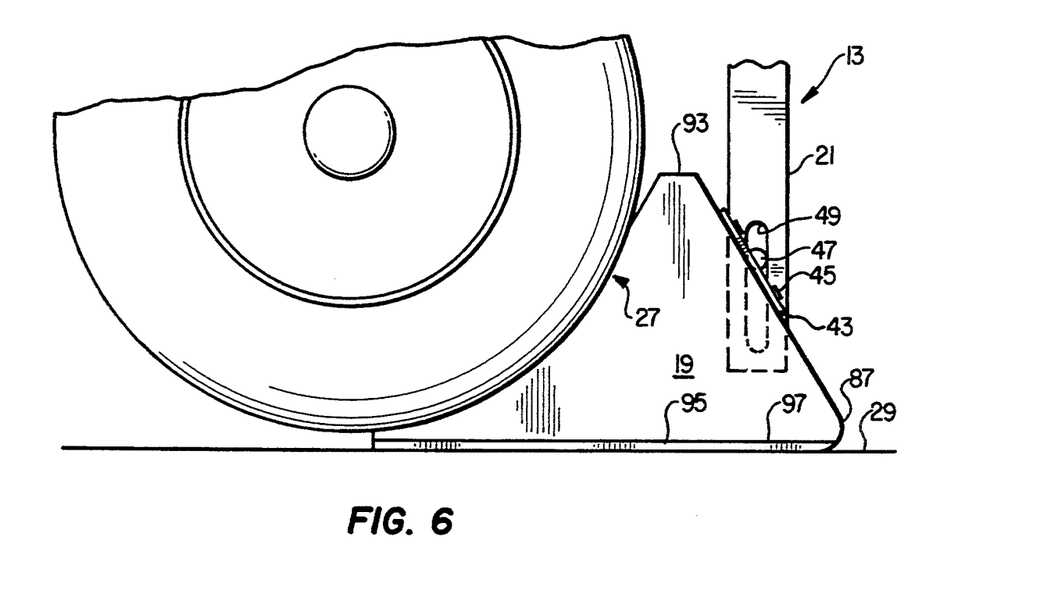
FIG. 6 is a side view of brake wedge having a arcuate tire-receiving surface.

In this embodiment, the rear surface 27 of the brake wedge 19 is formed by three straight segments. Alternately, as shown in FIG. 6, the rear surface 27 may be an arc whose radius is approximately that of the tire 17.

Prior art emergency braking systems transfer braking forces to the vehicle through the system's structure. That requires that the system structure be relatively strong, which results in a heavy system. In addition, the vehicle area to which the braking forces are transferred must have sufficient strength to resist the forces.

An important object of the present invention is that the emergency braking forces be transferred to the trailer 1 through the trailer's suspension (not shown). This allows a relatively light weight brake assembly 13 and eliminates the possible need to reinforce the trailer 1 where the brake assembly 13 is attached. To accomplish this object, the brake wedges 19 must be configured to retain their positions relative to the tires 17 substantially without the assistance of the remainder of the brake assembly 13; i.e., the brake wedges 19 must stand on their own.

During emergency braking, the tire 17 tends to roll over the brake wedge 19. The tire 17 also tends to tip the brake wedge 19 forward. For the brake wedge 19 to stand on its own, it must be configured to resist such tire roll over and tipping.

In FIG. 5, angle A is the angle of the upper portion 83 of the rear surface 27 of the brake wedge 19 relative to the road surface 29. The resistance of the brake wedge 19 to tire roll over increases as an angle A increases. However, as angle A increases, the vertical distance L1 above the road surface 29 of the point of contact 85 between the tire 17 and the brake wedge 19 increases. As the distance L1 increases, the tire's tendency to tip the brake wedge 19 forward increases. Also, increasing the distance L1 increases the size and weight of the brake wedge 19.

The length L2 between the vertical projection of the tire contact point 85 and the nose 87 of the brake wedge also affects the wedge's resistance to tipping. As length L2 increases, the wedge's resistance to tipping increases. However, increasing the length L2 increases the size and weight of the wedge.

We have found that if the nose 87 of the brake wedge 19 is rounded, the resistance of the brake wedge 19 to tipping is increased. If a brake wedge 19 begins to tip forward, a sharp nose 87 provides a high-friction area which acts as a pivot point, which exacerbates the tipping situation.

Thus, it will be appreciated that the profile of the brake wedge 19 is a compromise between tire roll over resistance, tipping resistance, and the size and weight of the brake wedge 19.

When the tire 17 first engages the brake wedge 19, the tire 17 continues to rotate for a brief period of time (the "transition period"), until friction between the tire 17 and the rear surface 27 of the brake wedge 19 dissipates the tire's rotational momentum. As a result of the frictional reaction between the tire 17 and the brake wedge 19, the forces which cause tire roll over and brake wedge tipping are greatest during the transition period. The vertical force developed during the transition period can be quite significant, resulting in the tire moving vertically or "hopping".

As discussed below in connection with FIG. 8, in the preferred embodiment of the invention, a control system 100 temporarily applies the brakes associated with the tires 17 as the brake assembly 13 moves from the inoperative position toward the operative position. This decreases the rotational momentum of the tires 17, which significantly decreases their tendency to move vertically when initially engaging the brake wedges 19.

The angle B of the lower portion 89 of the inner surface 27 of the brake wedge 19 relative to the road surface 29 also affects the tire's tendency to hop during the transition period. Increasing the angle B increases the vertical acceleration imparted to the tire 17 as it rolls onto the brake wedge 27, which increases hopping. Thus, to minimize its affect on hopping, angle B should be small. However, the strength of the rear end 91 of the brake wedge 19 is also related to the angle B. Increasing angle B increases the strength of the rear end 91 of the brake wedge 19, which must be sufficiently strong to resist internal bending loads. Thus, a compromise must be made between minimizing the angle B to decrease hopping and providing sufficient strength at the rear end 91 of the brake wedge 19.

We have found that constructing the brake wedges 19 of a slightly deformable material, rather than metal or similar rigid material, decreases hopping. In deforming, a brake wedge 19 absorbs energy, which reduces the energy available to accelerate the tire 17 vertically. For that reason, the brake wedges 19 of this embodiment are constructed of a semi-rigid, skinned polyurethane foam. Other suitable materials, such as solid elastomers, that are sufficiently deformable to absorb a substantial portion of the tire's rotational energy, while being sufficiently rigid to provide the necessary support for the tire 17, can be used. Also, the rear surfaces 27 of the brake wedges 19 are smooth, which minimizes their coefficient of friction, thus decreasing the rate at which the tire 17 is decelerated, which decreases hopping.

While the present invention substantially eliminates hopping under most conditions, some hopping may occur. Therefore, the vertical distance L3 between the tire contact point 85 and the top 93 of the brake wedge 19 must be sufficient to prevent the possibility of the tire 17 hopping onto the top 93 of the brake wedge 19, then rolling over it.

As stated above, the brake wedges 19 of this embodiment are constructed of a semi-rigid, skinned polyurethane foam. The diameter of the tires is 42 inches. The brake wedges' specifications in this preferred embodiment of the invention are as follows:

Angle A: 60 degrees;
Angle B: 8 degrees;
Length: 34 inches;
Height: 18.5 inches;
Width: 8 inches; and
Radius of nose: 1.5 inches.

A person skilled in the art will appreciate that variations of the dimensions can be made while still observing the performance parameters discussed above.

Figure 7:
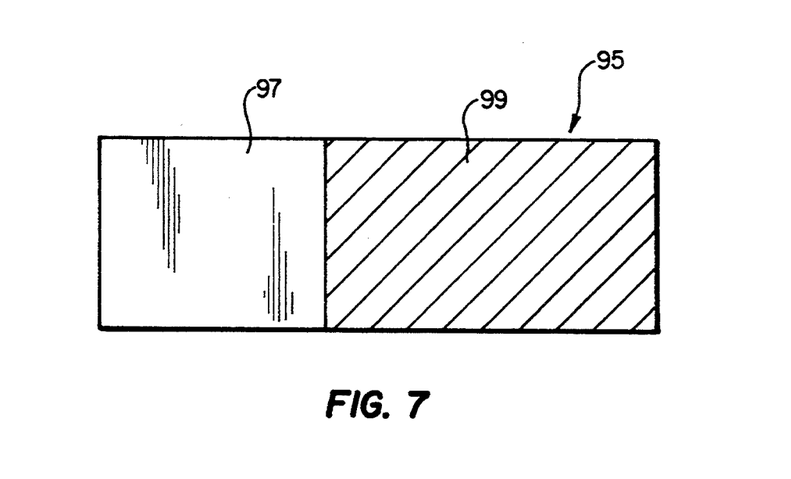
FIG. 7 is a bottom view of the brake wedge friction pad.

To increase the braking force of the wheel-brake wedge combination, a friction pad 95 (shown with an exaggerated vertical dimension) is attached to the bottom surface 97 of each brake wedge 19. We have found that if the friction coefficient of the rear portion of the friction pad 95 is greater than that of the forward portion, the tendency of the brake wedge 19 to tip forward during emergency braking is minimized. In this embodiment, as shown in FIG. 7, the friction pads 95 are constructed of polyurethane and rubber, the front 97 approximately 40 percent being polyurethane and the rear 99 approximately 60 percent being rubber.

Figure 8:
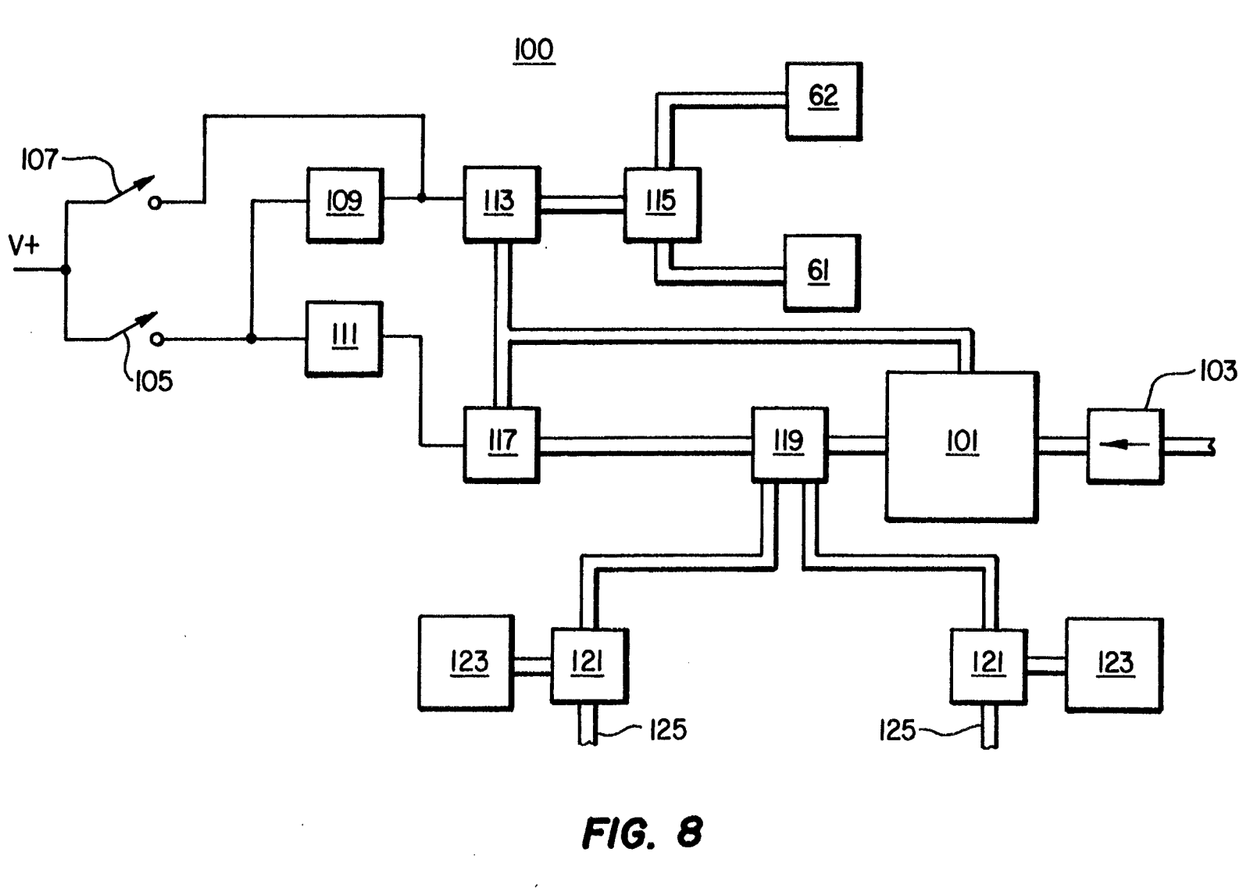
FIG. 8 is a schematic diagram of the control system.

Referring now to FIG. 8, an emergency brake control system 100 is provided which allows a vehicle's driver to control the position of the emergency brake assembly 13 from the driving position in the vehicle. In addition, when the driver initiates emergency braking, the control system 100 temporarily applies the service brakes associated with the tires 17 that engage the brake wedges 19 during emergency braking, decreasing the tires' rotational momentum and, thus, hopping.

Electrical power, V+, is supplied to the control system 100 by the vehicle's electrical system (not shown). Compressed air is supplied to an emergency brake air reservoir 101 from the vehicle's service air system (not shown). A one-way check valve 103 prevents loss of air pressure from the emergency brake reservoir 101 in the event of failure of the vehicle's service air system.

An emergency stop switch 105 and an emergency brake retract switch 107 are mounted in a position that is readily accessible from the normal driving position in the vehicle. To initiate emergency braking, the driver closes the emergency stop switch 105, thereby supplying electrical power to a normally-open, time-delay locking pin relay 109 and a normally-open, time-delay brake relay 111. When electrical power is supplied to the relays 109, 111, each closes for a predetermined period of time, then opens. In this embodiment, the locking pin relay 109 closes for one-half second and the brake relay 111 closes for one second.

When electrical power is supplied to the locking pin relay 109, it first closes, which provides electrical power to open a locking pin solenoid valve 113. Opening the locking pin solenoid valve 113 directs compressed air from the emergency brake air reservoir 101, through a quick-release valve 115, to the locking pin pneumatic cylinders 61, 62. After one-half second, the locking pin relay 109 opens, removing electrical power from the locking pin solenoid valve 113. The locking pin solenoid valve 113 closes, terminating the supply of compressed air to the locking pin pneumatic cylinders 61, 62. After the supply of compressed air to the locking pin pneumatic cylinders 61, 62 is terminated, the quick-release valve 115 acts to release air pressure from the locking pin pneumatic cylinders 61, 61.

When electrical power is supplied to the brake relay 111, it first closes, which supplies electrical power to open a brake solenoid valve 117. Opening the brake solenoid valve 117 directs compressed air from the emergency brake air reservoir 101 to a brake valve 119, which causes the brake valve 119 to direct compressed air from the emergency brake air reservoir 101, through shuttle valves 121, to the service brake cylinders 123 associated with the tires 17 that engage the brake wedges 19 during emergency braking. After one second, the brake relay 111 opens, terminating the supply of electrical power to the brake solenoid valve 117. The brake solenoid valve 117 closes, terminating the supply of compressed air to the brake valve 119. This terminates the supply to compressed air to, and releases the air pressure from, the service brake cylinders 123.

Due to the described actions of the locking pin relay 109 and the brake relay 111 (and that of the actuating components for the locking pins 35, 36 described above in connection with FIG. 4) closing the emergency stop switch 105 allows the emergency brake assembly 13 to drop from the inoperative position toward the operative position and temporarily applies the brakes associated with the tires 17 that engage the brake wedges 19 during emergency braking. Applying the brakes decreases the rotational momentum of the tires 17, thereby decreasing their tendency to move vertically upon initially engaging the brake wedges 19. The brakes are released to ensure that the tires 17 are not skidding when they initially contact the brake wedges 17, which could prevent or delay proper engagement of the tires 17 and the brake wedges 19. Releasing the brakes allows the tires 17 to roll onto the brake wedges 19 in a very controlled, gentle manner.

As described, in the preferred embodiment of the invention, the service brake cylinders 123 associated with the tires 17 that engage the brake wedges 19 during emergency braking are used to apply temporary braking to the tires 17. During normal (non-emergency) braking, the service brake cylinders 123 are actuated by compressed air that is directed to the cylinders 123 from the service brake system (not shown) through conduits 125 and the shuttle valves 121. Alternately, separate emergency brake pneumatic cylinders could be used to temporarily apply the brakes of the tires 17. In that case, the shuttle valves 121 would be unnecessary.

Closing the brake retract switch 107 applies electrical power directly to the locking pin solenoid valve 113, bypassing the locking pin relay 109. The locking pin solenoid valve 13 opens, which directs compressed air from the emergency brake air reservoir 101 to the locking pin pneumatic cylinders 61, 62. This disengages the locking pins 35, 36 from the brake assembly 13, and holds the locking pins 35, 36 in the disengaged position until the brake retract switch 107 is opened. The brake retract switch 107 is normally used when it is desired to move the brake assembly 13 from the operative position to the inoperative position, and doing so requires two persons, one to raise the brake assembly 13 to the inoperative position and one to open the brake retract switch 107 to allow the locking pins 35, 36 to engage the up striker plates 37 to retain the brake assembly 13 in the inoperative position.

The preferred embodiment of the invention includes a brake wedge 19 for each forward tire 17 of a tandem-axle trailer 1. An alternate embodiment (not shown) includes a pair of brake wedges, each brake wedge being wide enough to engage a pair of tires. In addition, we have found that the invention will function acceptably if emergency braking is applied on only one side of the vehicle, although the stopping distance increases with such a system.

It is to be understood that although the term "tire" is used herein, the invention is not limited to vehicles having tires mounted on their wheels, but can be adapted to operate on vehicles with solid wheels which make direct contact with the road surface. Therefore, as used herein, the term "tire" is intended to include the term "wheel". In like manner, the term "road surface" as used herein, is intended to include any surface upon which a wheeled vehicle can travel.

While the preferred embodiment of the invention has been shown and described, it will be apparent to those skilled in this art that various modifications may be made to this embodiment without departing from the spirit of the present invention. For that reason, the scope of the invention is set forth in the following claims.

We claim:

1. An emergency brake system for a wheeled vehicle comprising:
    a brake wedge including a tire-receiving surface and a road-engaging surface;
    a support structure connected to said brake wedge and said vehicle, said support structure adapted to allow said brake wedge to move between an inoperative position and an operatives position;
    a releasable retaining mechanism which retains said brake wedge in the inoperative position by engaging one of said support structure an said brake wedge; and
    a control system for releasing said retaining mechanism to allow said brake wedge to move toward the operative position, while substantially simultaneously applying a service brake to decrease the tendency of a tire associated with said service brake to move vertically when contacting said brake wedge, and subsequently releasing said service brake after a set delay.

2. The system of claim 1 wherein said retaining mechanism also retains said brake wedge in the operative position by engaging one of said brake wedge and said support structure.

3. The system of claim 1 wherein said control system comprises:
    a source of pressurized fluid;
    a first: electrically-actuated solenoid valve;
    a first fluid-actuated cylinder arranged to release said retaining mechanism;
    conduit connecting said fluid source to said first solenoid valve and said first solenoid valve to said first cylinder;
    a second electrically-actuated solenoid valve;
    a second fluid-actuated cylinder arranged to actuate said service brake; and
    a switch electrically connected between a source of electrical power and said first and second solenoid valves.

4. The system of claim 3 wherein said control system further comprises:
    a first time-delay relay electrically connected to said first solenoid valve;
    a second time-delay relay electrically connected to said second solenoid valve; and
    wherein said switch is electrically connected between said source of electrical power and said first and second relays.

* * * * *